US006826283B1

(12) United States Patent
Wheeler et al.

(10) Patent No.: US 6,826,283 B1
(45) Date of Patent: Nov. 30, 2004

(54) METHOD AND SYSTEM FOR ALLOWING MULTIPLE NODES IN A SMALL ENVIRONMENT TO PLAY AUDIO SIGNALS INDEPENDENT OF OTHER NODES

(75) Inventors: Thomas M. Wheeler, Bountiful, UT (US); Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 830 days.

(21) Appl. No.: 09/626,781

(22) Filed: Jul. 27, 2000

(51) Int. Cl.[7] .................................................. H04B 3/00
(52) U.S. Cl. ..................... 381/77; 381/104; 379/101.01
(58) Field of Search ............................... 381/77, 56–59, 381/300, 81, 85, 104, 107; 379/102.01, 102.03, 101.01; 340/825.25

(56) References Cited

FOREIGN PATENT DOCUMENTS

NL WO 97/26601 * 7/1997 ........... G06F/13/14

* cited by examiner

*Primary Examiner*—Melur Ramakrishnaiah

(57) ABSTRACT

A method and system capable of playing different audio signals in different nodes of a small environment. The system is comprised of a number of nodes, which may be rooms of a house or hotel, or offices of a business. Each node has at least one audio speaker. The system further comprises an audio signal distribution device, which is connected to the nodes and delivers audio signals to the nodes. The audio signal distribution device further comprises a storage device for storing the audio signals. At least one of the nodes has a control interface for selecting the audio signals to be transferred to the nodes. In this fashion, each node is capable of playing a different audio signal than any other node is playing concurrently.

19 Claims, 5 Drawing Sheets

METHOD AND SYSTEM FOR ALLOWING MULTIPLE NODES IN A SMALL ENVIRONMENT TO PLAY AUDIO SIGNALS INDEPENDENT OF OTHER NODES

TECHNICAL FIELD

The present invention generally pertains to the field of audio delivery systems. More particularly, the present invention is related to allowing multiple rooms to listen to audio signals independent of what is being played in other rooms.

BACKGROUND ART

It is desirable to have audio signals, such as music, playing in multiple rooms of a house or small business. Ideally, users could make virtually any audio selection, even if a large number of other rooms are currently playing audio and even if the other rooms are playing different audio signals. Unfortunately, conventional systems do not allow this freedom of choice.

Conventional systems often limit each room to one or two audio options. For example, the source may only pipe out audio from a home audio system. Thus, the user may be able to switch between, for example, the radio or CD player by moving a switch in the listening room. However, the user must listen to whatever is currently being played at the source, with control over the audio source being difficult or impossible, in some conventional systems. For example, in a business setting the user may be unable to switch to a different radio station.

Furthermore, in one conventional system, listening choices in each room are dependent on what is currently being played in other rooms. This is because the system outputs a very limited number of audio signals at one time. In one conventional system, a user in one room may listen to the radio, while a user in a second room may listen to a CD. However, the users may not listen to different Compact Discs at the same time, without the added cost of multiple CD-changers.

In such system, in order to add listening flexibility, the cost of hardware at the source rises substantially. For example, to have more channel selections, some systems add more source devices, such as CD players. Other conventional systems keep hardware costs lower, but sacrifice audio choices.

In some conventional systems, each room is connected to the source with wiring, which delivers an analog audio signal. Along with phone and electrical lines, this can lead to an enormous amount of wiring throughout the walls of a home or business. Consequently, cross-talk and interference occurs between the home-audio system and other services, such as phone-lines and power lines. Thus, the analog audio signal may be corrupted. Additionally, the wiring can be difficult and expensive to install.

Thus, a need has arisen for a method and system for playing audio signals in a small environment. A further need exists for a flexible system which allows remote switching between a wide variety of audio signals. A further need exists for such a system which allows the content delivered to be limited based on factors such as the room, the individual requesting the content, and the time. A still further need exists for a method and system which allows each node to play music independent of what any other node is currently playing. A further need exists for such a method and system which minimizes electrical interference, is low in cost, and requires a minimum of hardware and wiring.

SUMMARY

The present invention provides for a method and system of allowing audio signals, for example, musical selections, news reports, sportscasts, etc., to be played in a small environment. Embodiments of the present invention allow the audio signal to be switched remotely between a wide variety of audio signals. Embodiments of the present invention further provide for a system in which the audio signal being played at a node is independent of what is being played at any other node. Embodiments of the present invention allow control over the content of the audio signal, based on factors such as the room, the time of day, and the individual who is requesting the content. Embodiments of the present invention accomplish this without requiring substantial wiring to be added between the source and the nodes. Thus, embodiments of the present invention minimize signal corruption which may arise out of potential interference between the audio system and other systems.

A method and system capable of playing different audio signals in different nodes of a small environment is disclosed. The system is comprised of a number of nodes, which may be rooms of a house or hotel, or offices of a business. Each node has at least one audio speaker. The system further comprises an audio signal distribution device, which is connected to the nodes and delivers audio signals to the nodes. The audio signal distribution device further comprises a storage device for storing the audio signals. At least one of the nodes has a control interface for selecting the audio signals to be transferred to the nodes. In this fashion, each node is capable of playing a different audio signal than any other node is playing concurrently.

In one embodiment, the audio signals are stored on the audio signal distribution device in a digital file format, such as, for example MP3 ™ and/or other audio compression standard. The signals may originate from a source, such as, for example the Internet, a home stereo system, or an attached CD reader. In this embodiment, the audio signals are converted from analog to digital, if necessary; compressed; converted to a file format; and stored on the audio signal distribution device. After transferring the audio signal in digital form to the nodes, the node logic performs necessary decompression and file conversion; converts the signals from digital to analog; amplifies the signal; and plays the audio signal on the audio presentation devices.

In one embodiment of the present invention, the nodes temporarily store portions of the audio signals, e.g., packets of the audio signal, in a buffer. In this fashion, more packets can be received by the node and stored in the buffer while the node plays another portion of the audio signal (e.g., previously transferred packet). In another embodiment, the nodes store a playlist of audio signals which can be transferred from the audio distribution device.

In one embodiment, the signals are transferred to the nodes via wireless communication. Furthermore, the interface for selecting audio signals may be a palmtop computer communicating via wireless IR or RF.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Figure 1:
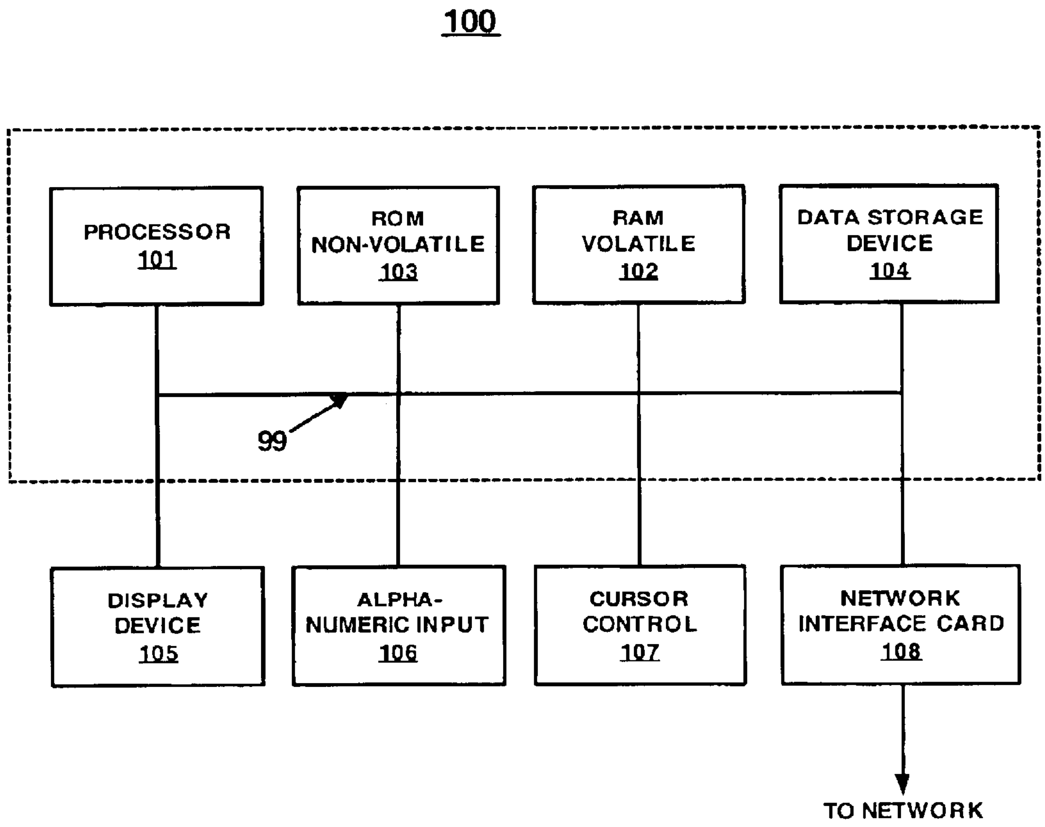
FIG. 1 is a schematic diagram of an exemplary computer system upon which the portions of the present invention may be practiced, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as “measuring”, “calculating”, “receiving”, “computing” or the like, refer to the actions and processes of a computer system, or similar electronic computing device. The computer system or similar electronic computing device manipulates and transforms data represented as physical (electronic) quantities within the computer system’s registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the present method and apparatus for allowing multiple nodes in a small environment to play audio signals independent of other nodes are comprised of computer-readable and computer-executable instructions which reside, for example, in computer-usable media of a computer system. FIG. 1 illustrates an exemplary computer system 100 used to perform the method in accordance with one embodiment of the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 99 for communicating information, and a central processor unit 101 coupled to bus 99 for processing information and instructions. Central processor unit 101 may be an 80×86-family microprocessor. System 100 also includes data storage features such as a computer usable volatile memory 102, e.g. random access memory (RAM), coupled to bus 99 for storing information and instructions for central processor unit 101, computer usable nonvolatile memory 103, e.g. read only memory (ROM), coupled to bus 99 for storing static information and instructions for the central processor unit 101, and a data storage unit 104 (e.g., a magnetic or optical disk and disk drive) coupled to bus 99 for storing information and instructions.

With reference still to FIG. 1, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A network interface card (NIC) 108 coupled to bus 99 is connected to a network and controls the flow of information over network. A more detailed discussion of the embodiments of the present invention, a method and apparatus for allowing multiple nodes in a small environment to play audio signals independent of other nodes, are found below.

Figure 2:
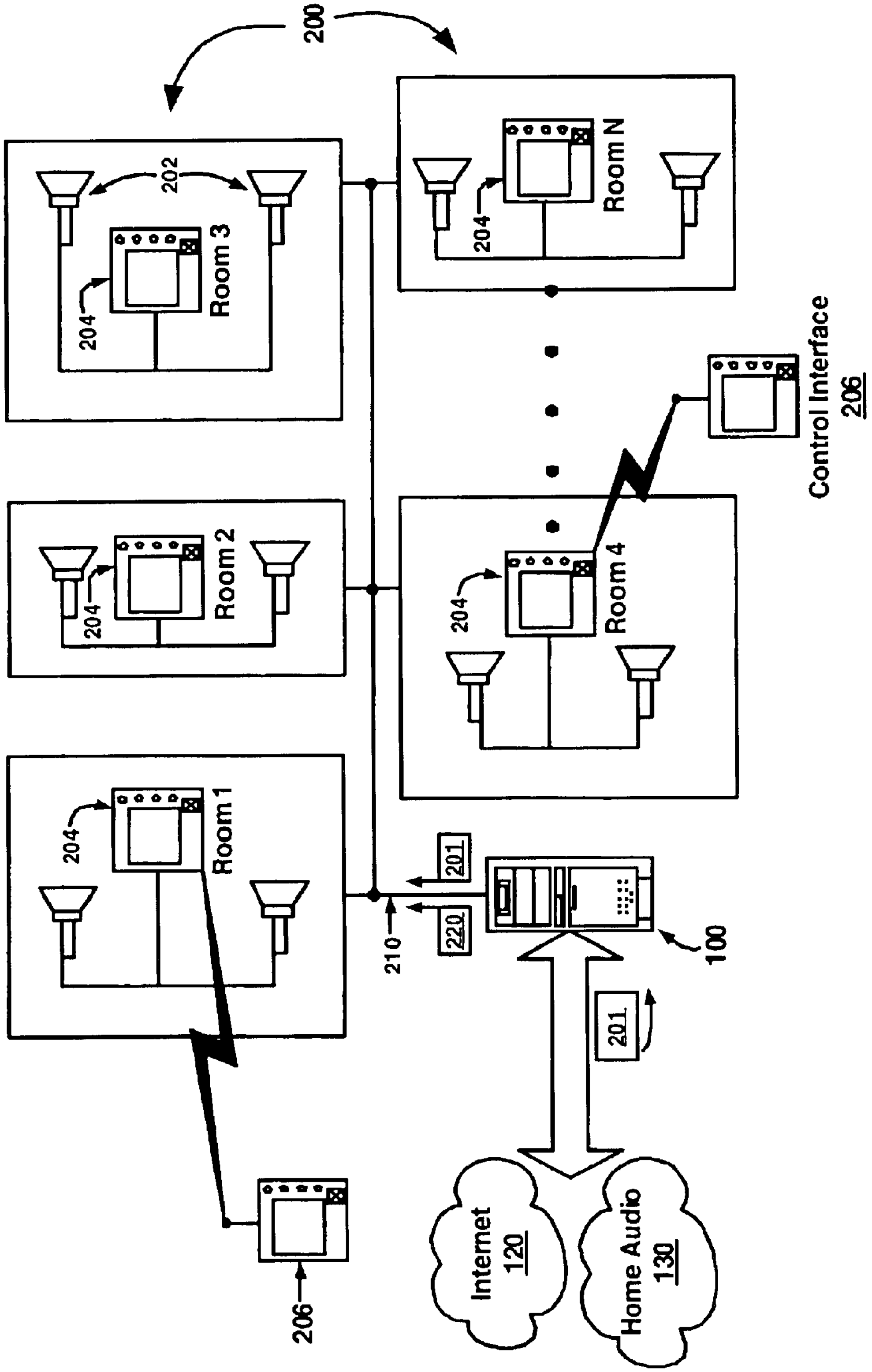
FIG. 2 is an illustration of the system for allowing multiple rooms to play audio signals independent of what is being played in other rooms, in accordance with the present invention.

FIG. 2 illustrates a method and system for allowing multiple nodes in a small environment to play audio signals independent of the audio signal being played at other nodes. For the purposes of the present invention, a small environment may be a home or a business. An audio signal distribution device 100 (e.g., the system shown in FIG. 1) is connected to a number of nodes 200 via communication link 210. The communication link 210 may be a wireline or wireless interface, such as, for example10Base-T, 100Base- T, USB, IEEE 1394, RS485, Powerline, wireless, or the like. By transferring digitized audio signals, the present invention may minimize possible signal corruption due to interference and cross-talk with other systems, such as, for example phone networks. For example, one embodiment of the present invention may perform error correction of the signal received at the node 200. In another embodiment, the signal may be sent again at the node's 200 request. Furthermore, the wireless embodiment is especially desirable, as wires do not have to be installed in walls or elsewhere.

Referring still to FIG. 2, the audio signal distribution device 100 is shown interfacing with the Internet 120 and a home audio unit 130. The audio signal distribution device 100 may input audio signals from these sources. The present invention is well suited to connect audio signal distribution device 100 to other audio sources as well. The audio signals 201 are processed, as discussed more fully below and sent on to the requesting node 200 as an audio signal 201 which may be in digital form. In one embodiment, the audio signal distribution device 100 sends the audio signal 201 as packets 220 in a file format. For example, the file format may MP3™ and/or other audio compression standard, or the like. However, the present invention is not limited to this file format.

Referring still to FIG. 2, the nodes 200 may be rooms of a home or hotel, or offices in a business environment. Each node 200 has a control interface 206 for inputting requests to play an audio signal 201. The requests are transferred to the audio signal distribution device 100, which transfers the requested audio signal 201 to the node 200. Each node 200 also has at least one audio presentation device 202, which in one embodiment are audio speakers. In one embodiment, the control interface 206 is a palmtop computer. In another embodiment, the control interface 206 may interface with any node's logic 204 which is within communication range and, in so doing, control the audio signal 201 played at any node 200. Thus, the user may control the volume in a bedroom node 200 from a living room node 200 without getting out of a chair.

Figure 3:
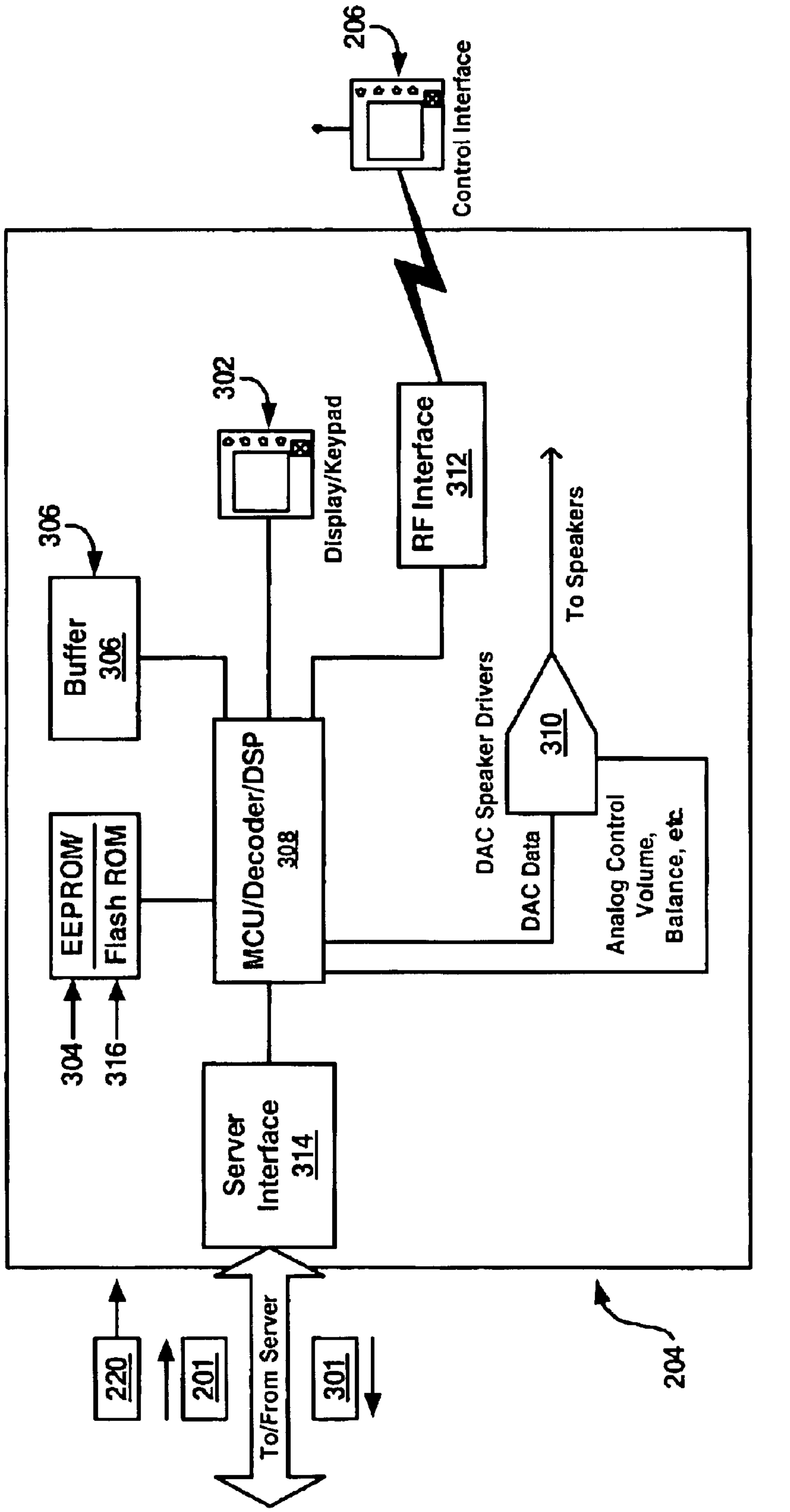
FIG. 3 is a logical block diagram illustrating components of the nodes, in accordance with one embodiment of the present invention.

Referring now to FIG. 3, which shows a schematic of node logic 204, details of the node logic 204 will be discussed. EEPROM 304 is used to store a playlist or multiple playlists of audio signals 201, which may be displayed on display 302. In another embodiment, the playlist is stored on the audio distribution device 100 (FIG. 2). The user may also have this list displayed on display 302. Furthermore, the user may create new playlists from a list of audio signals 201 available on the audio distribution device 100.

The present invention is well suited to allowing the user to enter commands into the node 200 in a variety of ways, such as, for example a keypad, a touchpad, Infrared, or Radio Frequency, etc. In one embodiment, the control interface 206 is the keypad of element 302. In another embodiment, the control interface 206 is a portable computer which communicates with the node logic 204 through RF interface 312. The present invention may use other types of control interfaces to input commands as well. In this fashion, the user may input requests for audio signals 301, or control the volume and tone of the played audio signal.

Referring still to FIG. 3, node logic 204 has server interface 314, which interfaces with the audio signal distribution device 100. Server interface 314 may be any of the wireline or wireless interfaces described herein which audio signal distribution device 100 communicates over. Requests 301 are sent to the audio distribution device 100 and the audio signal 201 is sent from the distribution device 100 through the server interface 314. Node logic 204 also has MCU/Decoder/Digital Signal Processing Logic 308 (hereinafter, DSP logic 308). MCU is a microcontroller, which runs in Flash ROM 316. DSP logic 308 performs the necessary decompression and file conversion of the audio signal 201 after it is received by the node logic 204 and sends the processed audio signal 201 to the Digital-to-Analog Converter (DAC)/Speaker Drivers 310. In one embodiment, DAC/ Speaker Drivers 310 has volume and tone controls. Buffer 306 is used to temporarily store audio signals 201 between receiving and playing them. The audio signals 201 which the buffer 306 stores may be packets 220 of data which the audio signal distribution device 100 has sent.

In one embodiment of the present invention, one node 200 serves as a master node 200, which supervises and controls all other nodes 200. For example, the master node 200 may be in the master bedroom for a home environment. In this fashion, the playlist and volume of all rooms (nodes 200) may be monitored and controlled from the master bedroom. For example, a parent may control the content and time of a child's listening. In an office environment, the signals sent to workers offices could be controlled and monitored as well.

Figure 4:
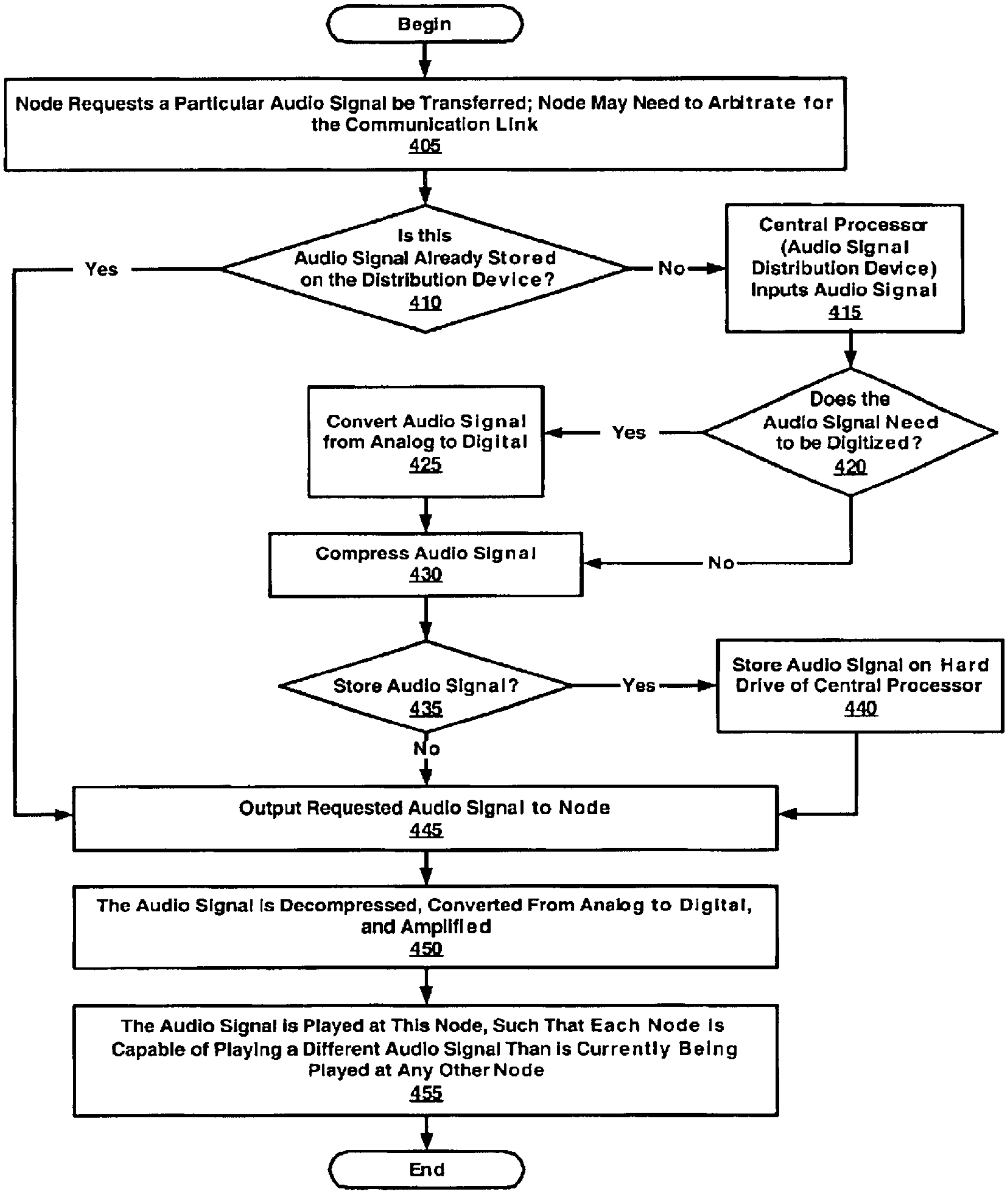
FIG. 4 is a flowchart showing the steps of allowing multiple nodes to play audio signals independent of what is being played in other nodes, in accordance with the present invention.

Referring now to FIG. 4, the steps of allowing multiple nodes 200 to play audio signals independent of other nodes 200 will be described. In step 405, a node 200 requests that the audio signal distribution device 100 transfer a particular audio signal. In one embodiment, the node 200 arbitrates for access to the communication link 210 in order to make the request.

In step 410, the audio signal distribution device 100 determines if the requested audio signal 201 is already stored on the distribution device 100. If it is stored, the present invention executes step 445 of outputting the audio signal 201 to the node 200. If it is not already stored, then in step 415, the audio signal 201 is received from an external source by the audio signal distribution device 100. The external source may be the Internet 120, a home audio entertainment unit 130, a CD player attached directly to the audio signal distribution device 100, or the like. Therefore, the user may easily switch between these sources without leaving the listening room.

In step 420, the central processor (audio signal distribution device) 100 determines whether the audio signal must be digitized. While many input signals, such as those from the Internet 120 will already be digital, the present invention is well suited to inputting analog signals, such as, for example from a radio tuner. If the signal needs to be converted, then in step 425, the signal is converted from analog to digital. The present invention is well suited to using any well known technique for converting the signal from analog to digital, such as, for example, a digital to analog converter or a sound card configured to perform such a conversion.

In step 430, the present invention compresses the digital signal. The present invention is well suited to using a variety of formats, such as, for example MP3™ and/or other audio compression standard, or the like. In one embodiment, the user is allowed to choose the format of the requested audio signal 201. In this fashion, an audio purest can have an uncompressed audio signal sent. In another embodiment, the node 200 allows for only one file format. This allows for a simpler decompression algorithm and reduces hardware costs at each node 200.

In step 435, the present invention determines whether the signal is to be stored for later use. If the signal is to be stored, step 440 is performed. In step 440, compressed digital signals are stored on the central processor (audio signal distribution device) 100. For example, central processor 100 may comprise a general computer system such as, for example, the one illustrated in FIG. 1. In this case, the signals may be stored on data storage device 104. With typical compression ratios and sampling rates and with a modest storage device of 20GB, hundreds or even thousands of hours of compressed audio can be stored. The present invention is also well suited to storing uncompressed audio signals 201.

However, the audio signals 201 do not have to be stored for later use. For example, in one embodiment, digital Compact Disc music data is stripped off the CD on-the-fly and sent to the requesting node 200 without storing the audio signal 201 data. Thus, step 440 is not performed.

In step 445, the audio signal 201 is sent out to the requesting node 200 as a digital audio signal 201. In one embodiment, the digital audio signal 201 is comprised of packets. Since an entire compressed audio signal 201 may be transferred in a few seconds, the audio signal distribution device 100 may service many nodes at once. With a compression efficiency of about 1:20, up to 280 nodes can be serviced in real-time. The present invention is well suited to use wider bandwidth connections, as well as higher compression ratios. Therefore, even more nodes can be served, in other embodiments.

In step 450, the node 200 decompresses the audio signal 201, performs the necessary file conversion, converts the signal from analog to digital, and amplifies the audio signal 201.

In step 455, the audio signal 201 is played at the node 200. In this fashion, each node 200 is capable of playing a different audio signal 201 than is being played at any other node 200. Furthermore, each node has a wide selection of audio sources and may switch easily between them.

If there is particularly heavy traffic, if the connection bandwidth is limited, or if the signals are not compressed before transfer, it may take more than a few seconds to transfer a song. In this case, a circular buffer method may be used to allow for a second audio signal 201 to be transferred while a first audio signal 201 is still playing. This will limit or eliminate the time gap between one audio signal 201 finishing and another starting at a node 200. This may be used in conjunction with a playlist such that the next song on the playlist may be transferred and stored, at least in part, in the circular buffer 306 before the previous song is finished playing.

Figure 5:
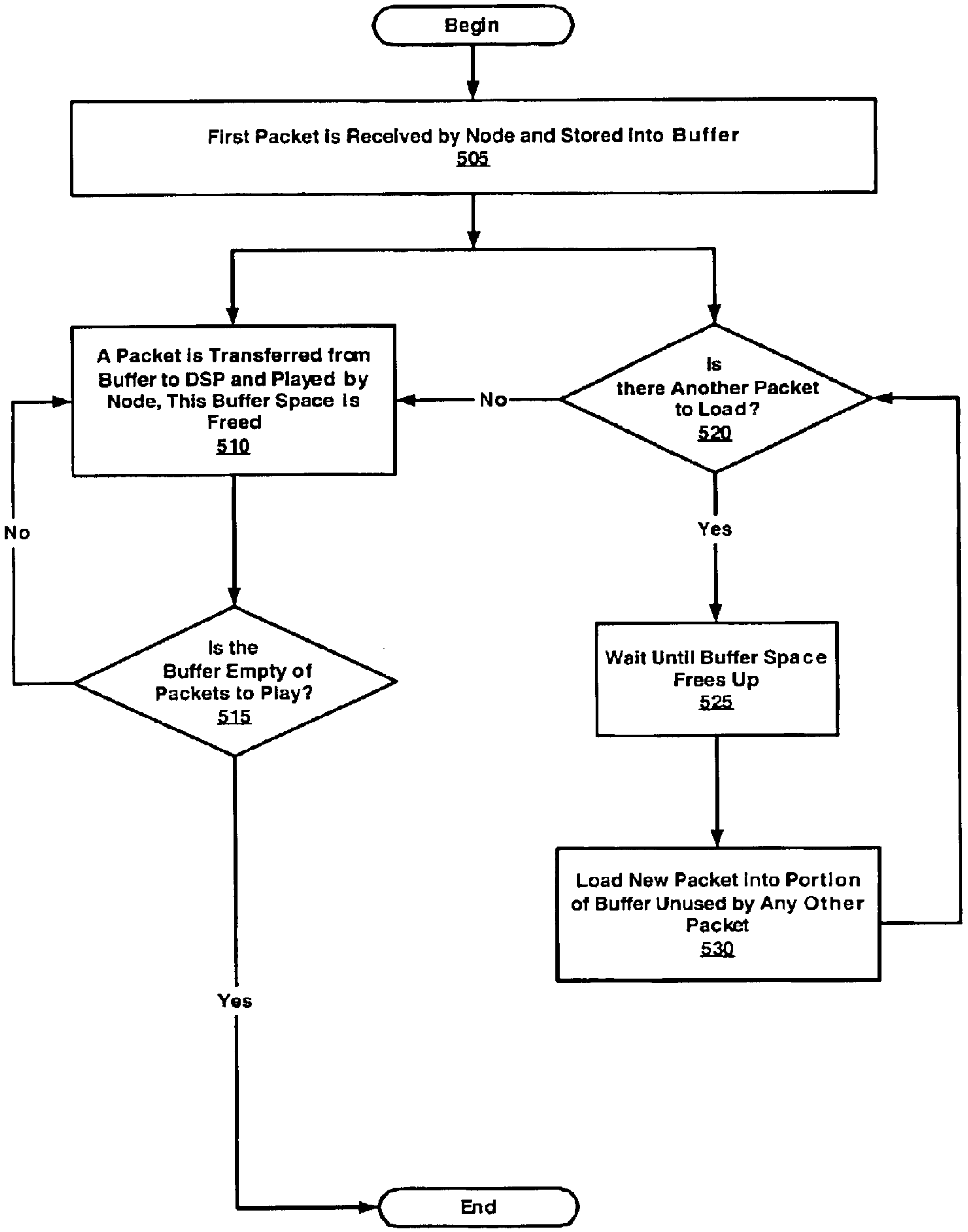
FIG. 5 is a flowchart of the steps of a node using a buffer to store a second audio signal while a first audio signal is playing at the node, in accordance with one embodiment of the present claimed invention.

FIG. 5 shows the steps of one node 200 playing an audio signal 201 while receiving other audio signals 201. In the embodiment described, the audio signal 201 is comprised of packets 220. However, the present invention is not limited to storing audio signals 201 in packet 220 form in the buffer 306. In step 505, a first packet 220 is received by the node 200 and stored in a buffer 306. Steps 510–515 represent the packet 220 coming out of the buffer 306, and steps 520–530 represent the steps of transferring a new packet 220 into the buffer 306. The sequences occur simultaneously. In step 510, a portion of the audio signal, e.g., a packet 220, is transferred from the buffer 306 to the Digital Signal Processor 308 and on to the DAC 310. Thus, buffer space is freed up.

In step 515, the node 200 determines whether any more un-played packets 220 are in the buffer 306. If so, step 510 is performed again until all packets 220 have been played at this node 200.

In step 520, the node 200 determines whether the audio distribution device 100 is prepared to transfer another packet 220. If so, in step 525, the node 200 must determine if there is room in the buffer 306. If not, the node 200 will not receive the new packet 220 from the audio distribution device 100 until buffer space frees up. For example, the node 200 may send a signal to the audio distribution device to halt sending packets 220 temporarily.

When buffer 301 space is free, the node 200, in step 530, allows the audio distribution device 100 to transfer a new packet 200, which it stores in the buffer 306 while another audio signal 201 (e.g., a packet 220) is playing. The buffer 306 is used in circular fashion, such that the new packet 220 may overwrite data corresponding to a packet 220 which has already played. After loading in the latest packet 220, the node 200 repeats step 520 of checking to see if there is another packet 220 to be transferred from the audio distribution device 100.

In one embodiment, in order to reduce the cost of hardware at the nodes 200, the audio signal 201 is decoded at the audio distribution device 100, embedded with control fields, and sent to the nodes 200 as DAC data.

Therefore, it will be seen that the present invention allows multiple nodes in a small environment to play audio signals independent of other nodes. The present invention allows the audio signal to be switched remotely between a wide variety of audio signals. The present invention accomplishes this without requiring substantial wiring or hardware. Furthermore, the present invention minimizes electrical interference between the itself and other systems such as phone networks.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A system for distributing audio in a small environment comprising:

a) a plurality of nodes;

b) each of said plurality of nodes having at least one audio presentation device;

c) an audio signal distribution device connected to said plurality of nodes, said audio signal distribution device adapted to distribute audio signals to said plurality of nodes;

d) a storage device coupled to said audio signal distribution device, said storage device adapted to store said audio signals; and e) at least one of said plurality of nodes having a control interface, said interface for selecting audio signals to be transferred from said audio signal distribution device to said plurality of nodes, such that each node of said plurality of nodes is capable of playing a different audio signal than is being played concurrently on any other one of said plurality of nodes, wherein at least one of said plurality of nodes further comprise logic for storing a list of audio signals which can be transferred from said audio signal distribution device.

2. The system of claim 1 wherein said control interface is a portable computer system.

3. The system of claim 1 wherein at least one of said plurality of nodes further comprise:

audio signal processing logic, said audio signal processing logic adapted to process audio signals from said audio signal distribution device into a form usable by said audio presentation device.

4. The system of claim 1 wherein at least one of said plurality of said nodes comprise:

logic for storing said audio signals transferred from said audio signal distribution device, wherein said audio signals may be presented at a later time.

5. The system of claim 1 wherein said audio signal has a digital format.

6. A method of distributing audio in a small environment comprising the steps of:

a) storing a plurality of audio signals on a central processor;

b) presenting a plurality of nodes a selection comprising a plurality of audio signals external to the central processor and at least a portion of the stored audio signals;

c) selecting audio signals from the selection presented in said b) to be transferred from said central processor to said plurality of nodes by inputting requests into said plurality of nodes;

d) transferring said audio signals selected in said c) from said central processor to said nodes; and e) presenting said audio signals transferred in said d) on a plurality of audio presentation devices, wherein each audio presentation device is coupled to one node of said plurality of nodes, such that each node of said plurality of nodes is capable of playing a different audio signal than is being played concurrently on any other node of said plurality of nodes.

7. The method of claim 6 wherein step a) further comprises:

a1) receiving said plurality of audio signals from an external source; and a2) compressing said plurality of audio signals.

8. The method of claim 7 wherein step a1) further comprises the step of digitizing said plurality of audio signals.

9. The method of claim 6 wherein said e) further comprises the steps of:

receiving said audio signals transferred in said d) at said plurality of nodes; and translating said received audio signals into a form suitable for said audio presentation devices.

10. The method of claim 6 wherein said c) comprises the step of selecting said audio signals from the selection presented in said b) to be transferred to said plurality of nodes by inputting information into a portable computer system interfaced to at least one node of said plurality of nodes.

11. The method of claim 6 further comprising one node of said plurality of nodes storing at least one audio signal of said plurality of audio signals in a buffer coupled to said one node of said plurality of nodes.

12. The method of claim 6 further comprising transferring a second audio signal of said plurality of audio signals to one node of said plurality of nodes; and storing said second audio signal in a buffer coupled to said one node of said plurality of nodes while a first audio signal of said plurality of audio signals is being presented on the audio presentation device coupled to said one node of said plurality of nodes.

13. The method of claim 12 wherein said second audio signal comprises a second packet and said first audio signal comprises a first packet.

14. The method of claim 6 further comprising the step of:

said plurality of nodes arbitrating for the transfer of said plurality of audio signals from said central processor.

15. The method of claim 6, further comprising, prior to said d):

determining if a first audio signal selected in said c) and received by the central processor comprises an audio signal stored on the central processor; and if said first audio signal is not stored on the central processor, determining an external source coupled to the central processor from which to access the first audio signal.

16. An audio signal distribution system for distributing audio signals in a small environment comprising:

a) an audio signal distribution device, said audio signal distribution device adapted to distribute audio signals to a plurality of nodes, wherein each node of said plurality of nodes has at least one audio presentation device, such that said each node of said plurality of nodes is capable of playing a different audio signal than is being played concurrently on any other node of said plurality of nodes;

b) a storage device coupled to said audio signal distribution device, said storage device adapted to store said audio signals;

c) request logic connected to said storage device and adapted to interface with said plurality of nodes; said request logic for receiving requests to transfer audio signals to said plurality of nodes;

d) receiving logic coupled to said audio signal distribution device, said receiving logic for receiving audio signals from an external source;

e) compression logic connected to said receiving logic and connected to said storage device, said compression logic for compressing said audio signals; and f) determination logic coupled to said storage device and operable to determine if a first audio signal associated with a request to transfer the first audio signal to a node is stored on the storage device, and said determination logic further operable to determine an external source coupled to the central processor from which to access the first audio signal if said first audio signal is not stored on said storage device.

17. The system of claim 16 where said external source is the Internet.

18. The system of claim 16 where said external source is a local media device.

19. The system of claim 16 further comprising g) conversion logic connected to said receiving logic and connected to said compression logic, said conversion logic for converting said audio signals from analog to digital.

* * * * *